(12) United States Patent
Chang et al.

(10) Patent No.: US 6,913,359 B2
(45) Date of Patent: Jul. 5, 2005

(54) PROJECTION METHOD WITH REAL OBJECT PROJECTOR

(75) Inventors: Jih-Ching Chang, Hsinchu (TW);
Teng-Chou Yang, Hsinchu (TW);
Chih-Kuang Wang, Hsinchu (TW)

(73) Assignee: Microtek International Inc., Hsinchu (TW)

( * ) Notice: Subject to any disclaimer, the term of this patent is extended or adjusted under 35 U.S.C. 154(b) by 0 days.

(21) Appl. No.: 10/662,292

(22) Filed: Sep. 16, 2003

(65) Prior Publication Data

US 2005/0057725 A1 Mar. 17, 2005

(51) Int. Cl.$^7$ .................. G03B 21/08; G03B 21/20; G03B 21/14; G03B 21/22; G02F 1/1335
(52) U.S. Cl. .................. 353/28; 353/63; 353/87; 353/119; 353/120; 349/6
(58) Field of Search .................. 353/28, 22, 40, 353/44, 63, 74–76, 79, 88, 91, 100–101, 119, 122, 64, 87, 120; 349/1, 5–6; 358/400, 405, 505; 40/700

(56) References Cited

U.S. PATENT DOCUMENTS 5,282,064 A * 1/1994 Yamada .................. 358/487

\* cited by examiner

*Primary Examiner*—Judy Nguyen
*Assistant Examiner*—Rochelle Blackman
(74) *Attorney, Agent, or Firm*—Rosenberg, Klein & Lee

(57) ABSTRACT

A projection method using a real object projector is disclosed. The real object projector comprises a base, a control circuit installed in the base, and an image receiving apparatus installed on the base. The base is combined with a light source module, and between the light source module and the base is a different movable connection relationships according to different designs. The light source module can have a transparent film clip with an identifying mark, and different transparent film clips have different marks. When projecting with the real object projector the steps are, firstly moving the image receiving apparatus to a suitable position according to the mark on the transparent film clip, then focusing the image receiving apparatus according to the transparent film clip, and finally pressing an image receiving key to automatically identify the kind of transparent film clip and magnify the projection image with the control circuit. The real object projector has a design with a movable light source module, and is flexible and convenient. The projection method can suitably magnify the image according to the kind of transparent film, and adjust for maximum magnifying power.

5 Claims, 12 Drawing Sheets

PROJECTION METHOD WITH REAL OBJECT PROJECTOR

BACKGROUND OF INVENTION

1. Field of the Invention

The invention relates to a projection method with a real object projector, and more particularly, to a projection method which suitably magnifies a projected image of a transparent film according to the transparent film type.

2. Description of the Prior Art

Projectors or projection tools are commonly used for displaying visual aids during presentations or conferences FIG. 1 shows a conventional projector. An image apparatus 12 is installed on a base 10, and the image apparatus 12 includes an arm 14 and a lens 16. When projecting an object 18, the object 18 is placed under the lens 16, and the lens 16 focuses on the object 18. A user can adjust the magnification of the image and adjust the focus with the lens 16 according to his requirements.

However, when a user needs to project a transparent film, the projector fails to project the transparent film, since a bottom light source is needed. An extra light source module 20 is required for the projector to project the transparent film 22, as FIG. 2 shows. Lacking a light source module 20 prevents the projection of the transparent film 22.

The method of projecting a transparent film is by placing the transparent film 22 on top of the light source module 20, and under the lens 16 and focusing the lens 16 on the transparent film 22. Then the user adjusts the projected image size and focus according to the size of the transparent film. When there is more than one size of transparent film 22, users need to continuously adjust the projected image size and focus according to the different transparent films 22. This is inconvenient and results in a poor quality of presentation.

Therefore, there is need for an improved projection method with a real object projector to project kinds of transparent films.

SUMMARY OF INVENTION

It is therefore an objective of the present invention to provide a projection method using a real object projector to solve the above-mentioned problems. A light source module is installed on a base of the real object projector to project a transparent film. The projection method can optimally magnify images in accordance with various sizes of transparent films.

According to the claimed invention, A projection method of a real object projector which comprises a light source module that further includes a transparent film clip having a mark, a control circuit and an image receiving apparatus comprise steps of: automatically or manually moving the image receiving apparatus to a suitable position in accordance with the mark on the transparent film clip; then automatically or manually focusing the image receiving apparatus according to the transparent film clip; and pressing an image receiving key to magnify the projected image via a control circuit; or automatically identifying the kind or type of transparent film and magnifying the projected image.

These and other objectives of the present invention will no doubt become obvious to those of ordinary skill in the art after reading the following detailed description of the preferred embodiments that are illustrated in the various figures and drawings.

DETAILED DESCRIPTION

Figure 1:
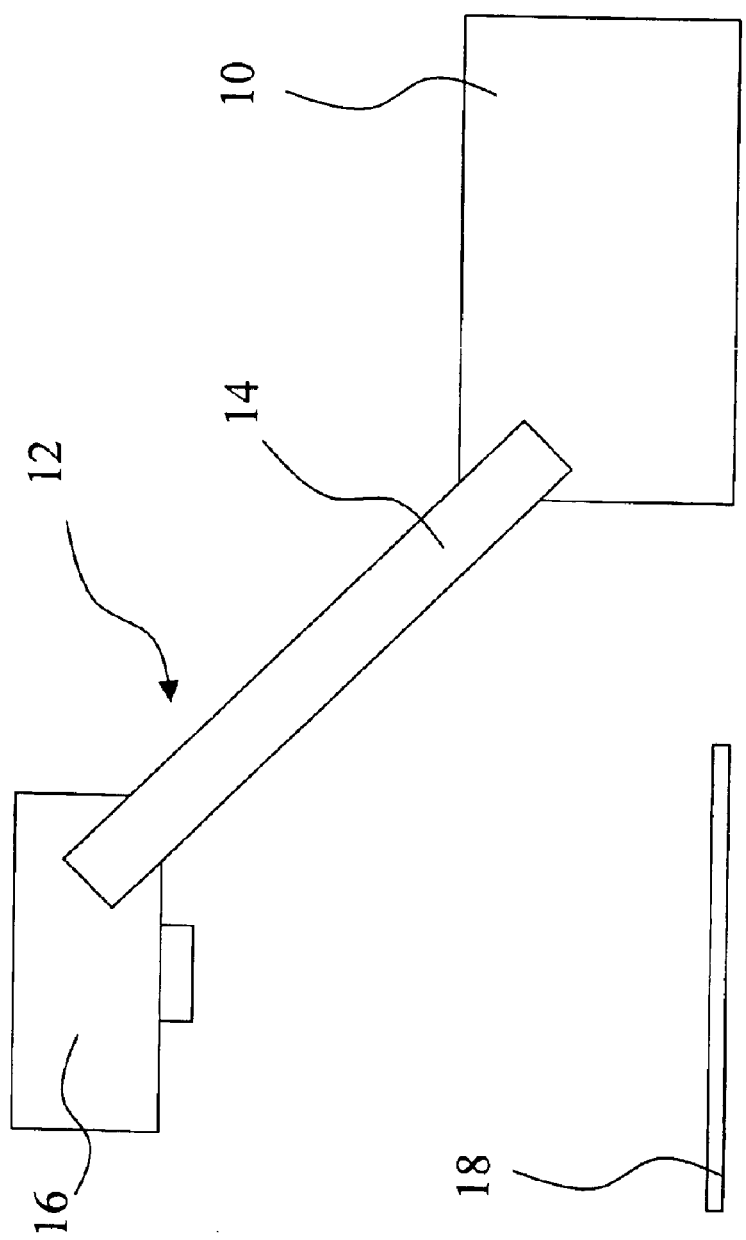
FIG. 1 is a diagram of a projector according to the prior art.
Figure 2:
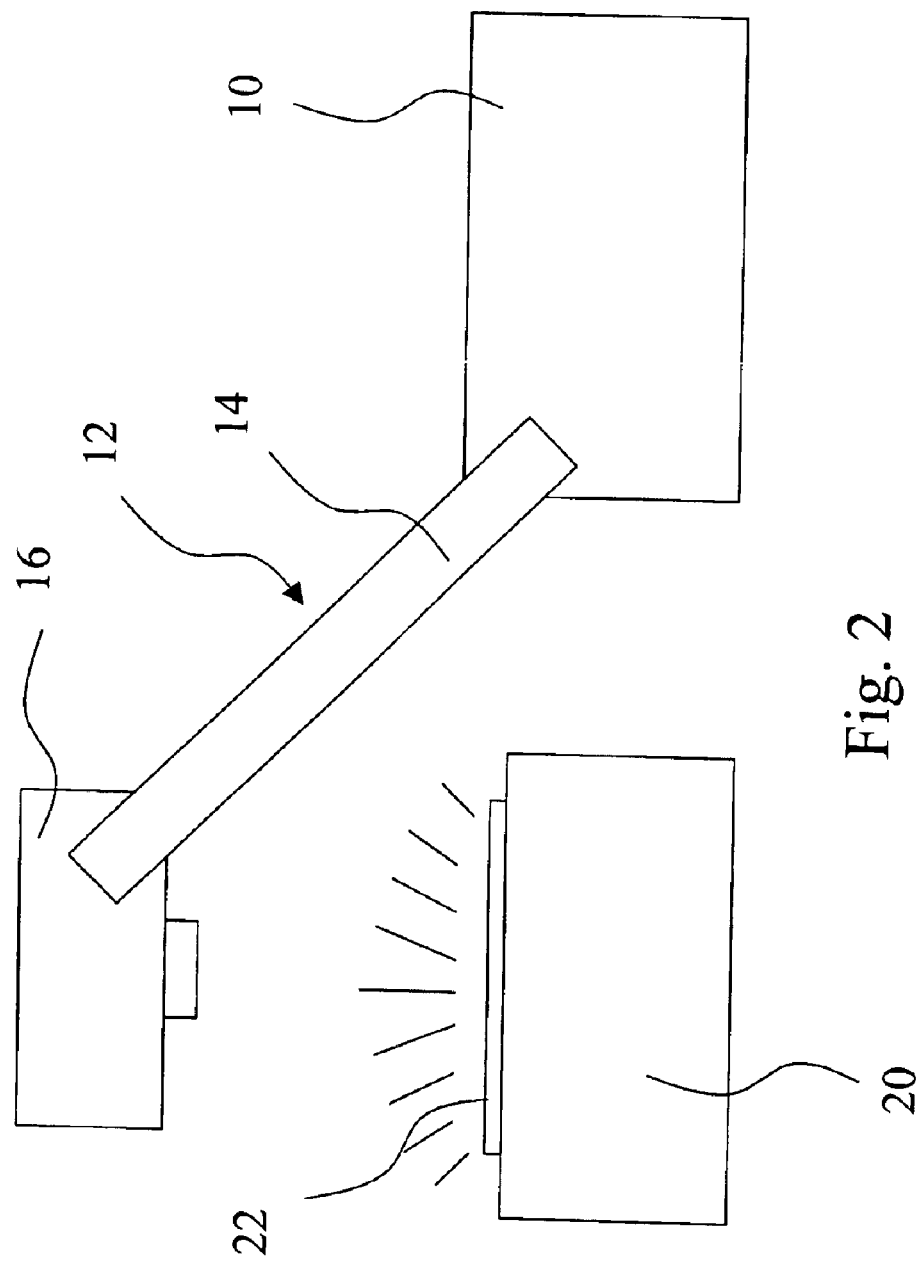
FIG. 2 is a diagram of projecting a transparent film using a projector according to prior art.
Figure 3:
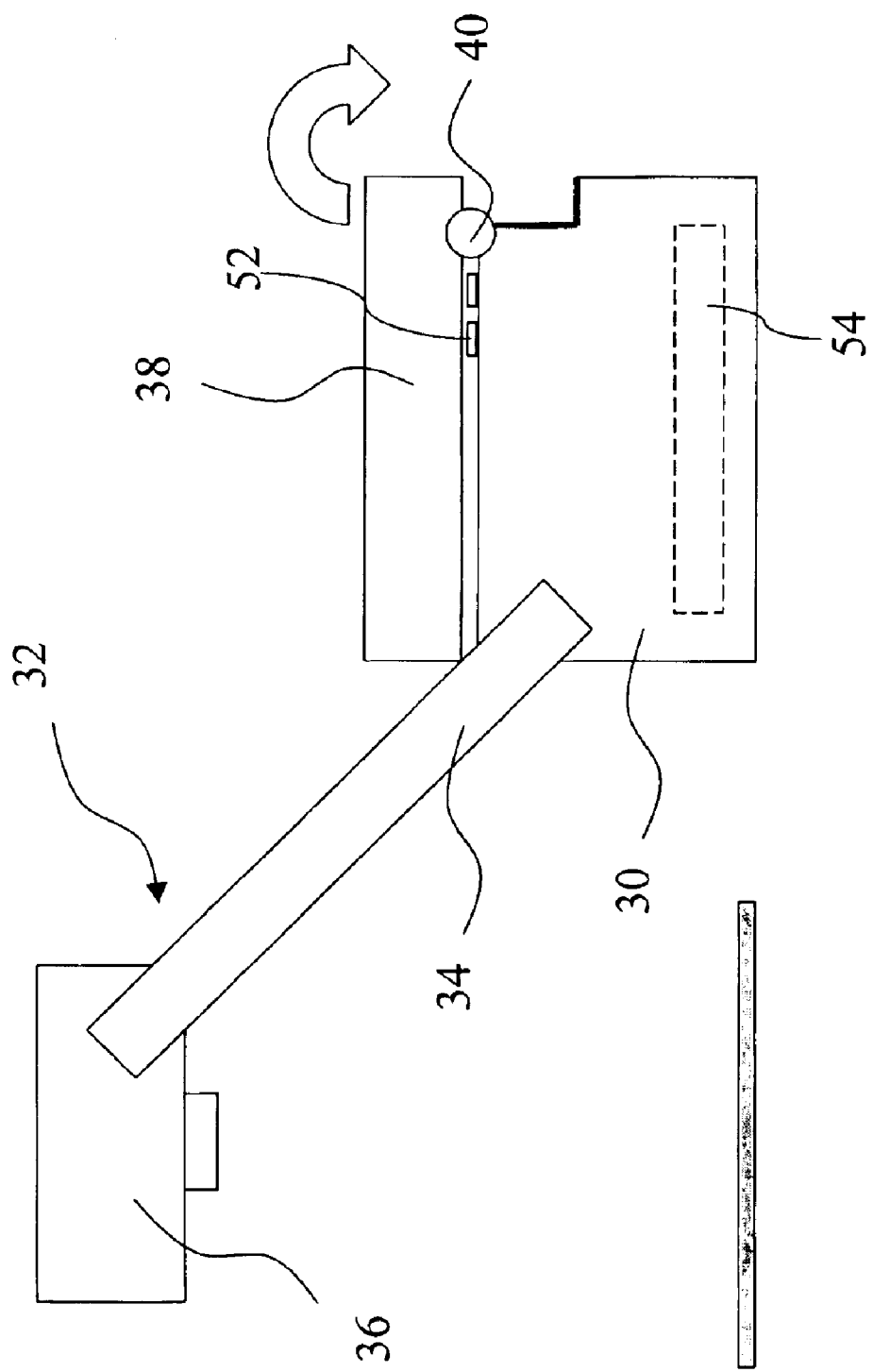
FIG. 3 is a diagram illustrating projecting a real object using a real object projector according to an embodiment of the present invention.
Figure 4:
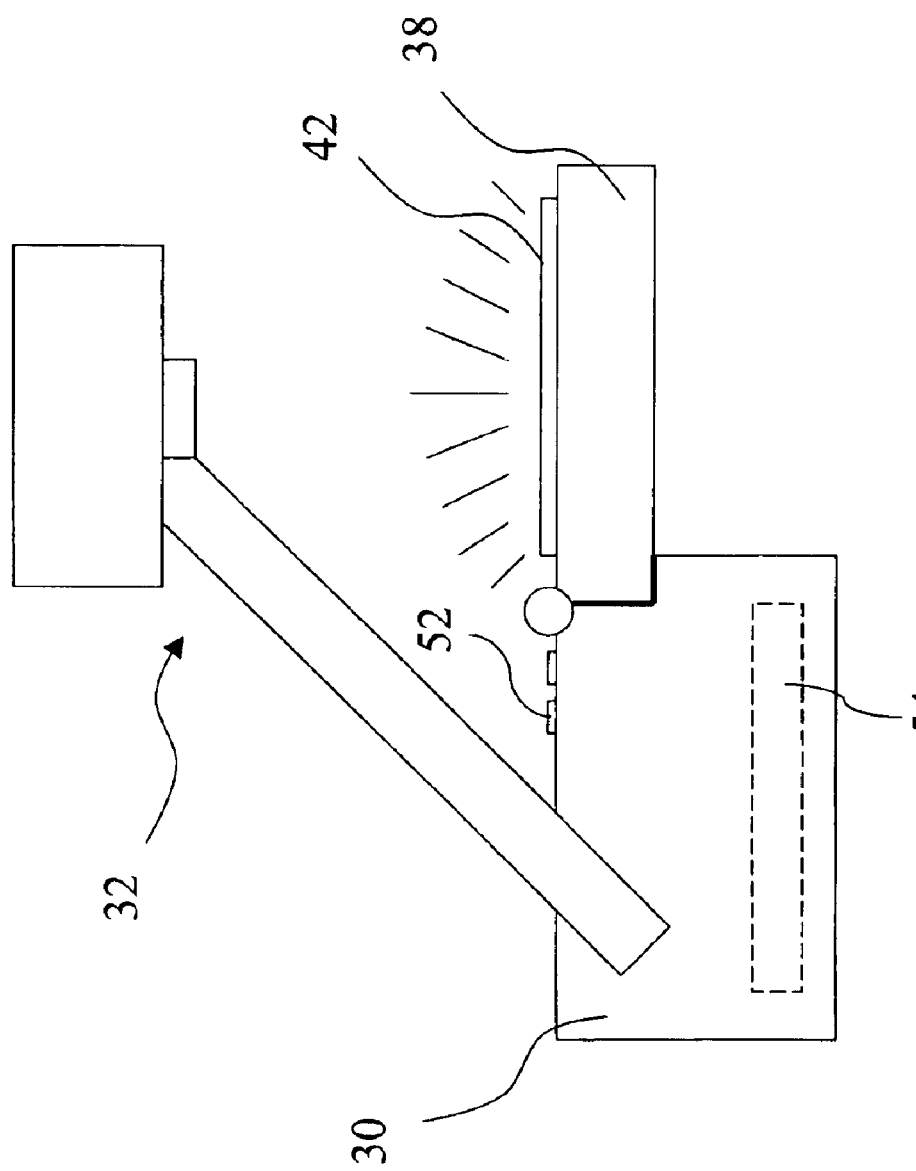
FIG. 4 is a diagram illustrating projecting a transparent film using a real object projector according to an embodiment of the present invention.
Figure 5:
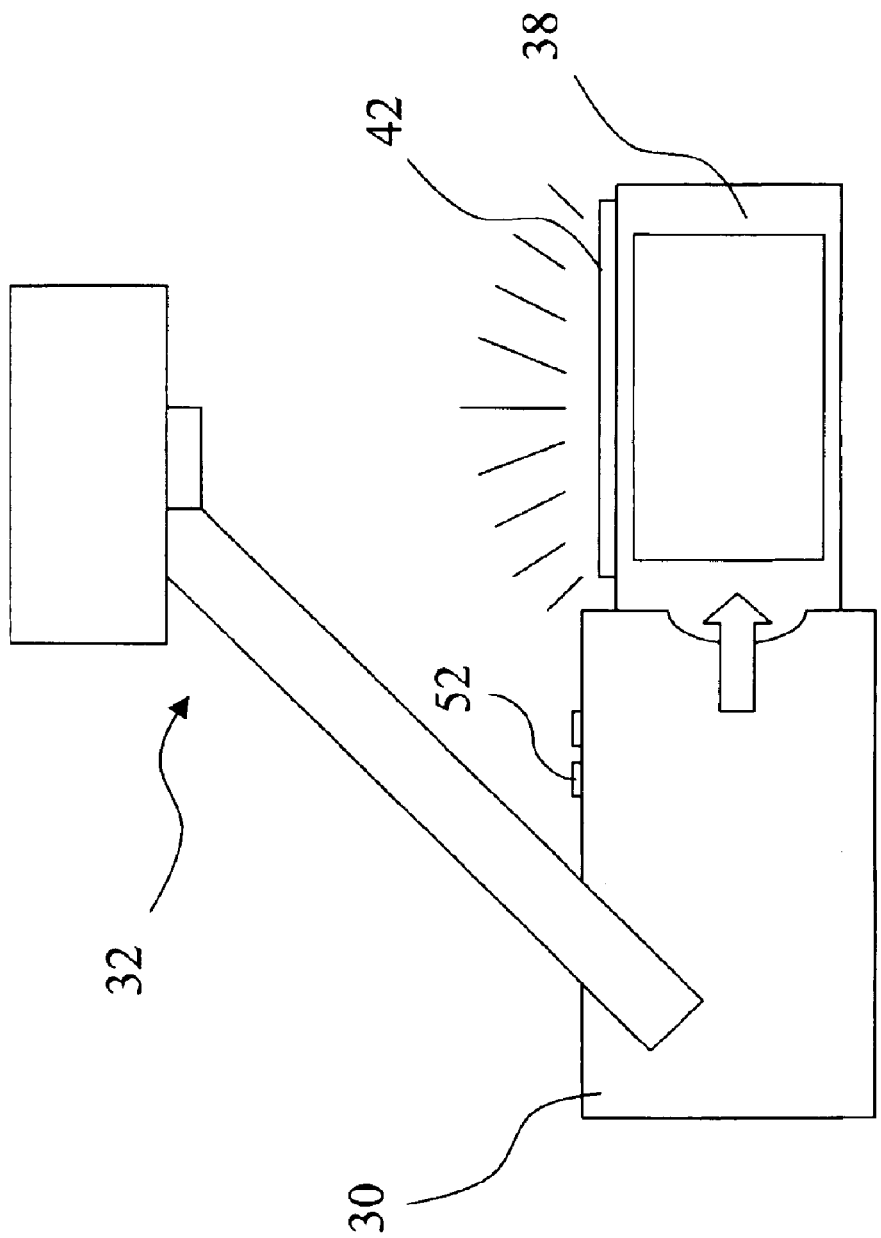
FIG. 5 and FIG. 6 are diagrams of a real object projector according to embodiments of the present invention.
Figure 6:
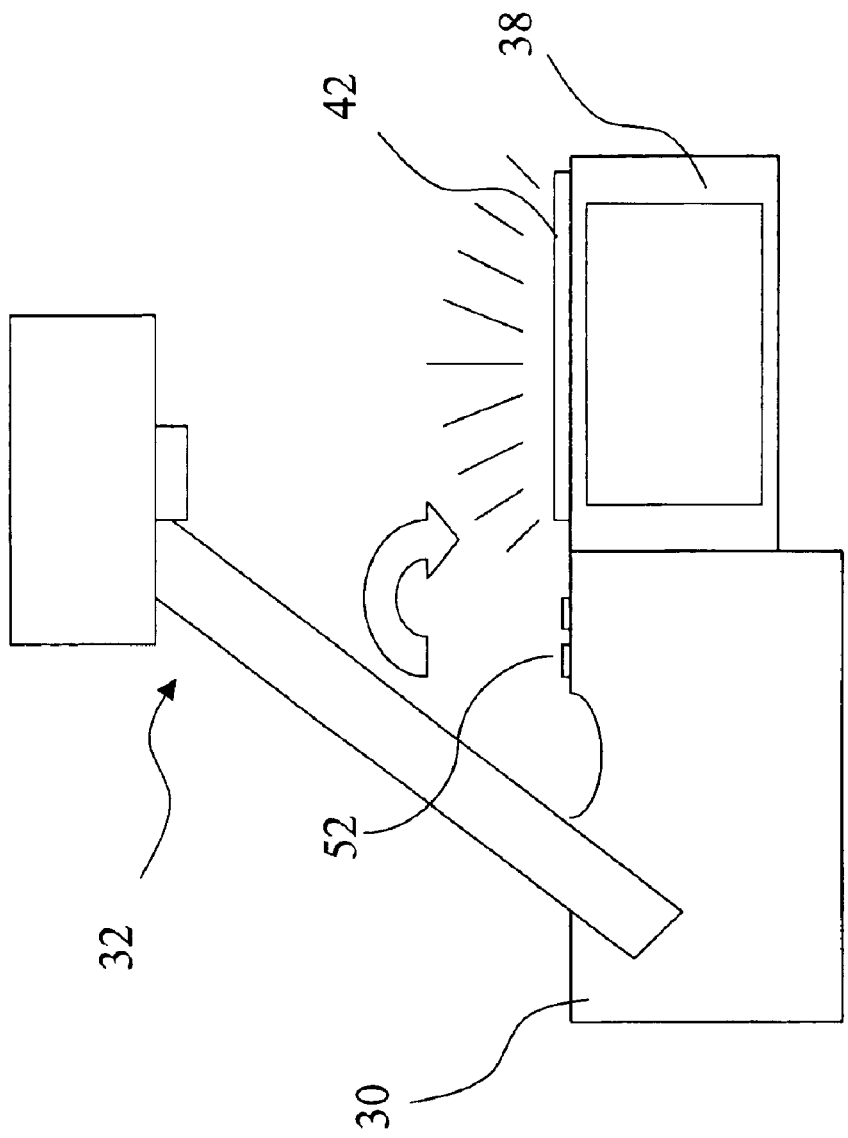

FIG. 3 and FIG. 4 are diagrams illustrating a real object projector which can carry out a projection method according to the present invention. The real object projector comprises a base 30 in which a control circuit 54 is installed for receiving and transferring the image data, and identifying and magnifying it. An image receiving apparatus 32 is connected to the base 30. The image receiving apparatus 32 comprises an arm 34 connected to the base 30 and a lens module 36 installed on the arm 34. The arm 34 can be rotated in a limited angle or range with a fulcrum connecting the arm 34 and the base 30. The lens module 36 is used to capture an image. A light source module 38 is connected to the base 30 by an axle 40. The light source module 38 can be rotated in a limited angle with the axle 40 acting as a fulcrum. A damper can be further installed on the axle 40 for buffering the rotation of the light source module 38. Furthermore, the rotation of the light source module 38 can be operated manually or automatically with a combination of a motor, a gear wheel, a rack, a belt and so on. Further, as FIG. 5 and FIG. 6 show, the light source module 38 can be designed to be stored in the base 30 and be taken out from the base 30 by pulling or rotating. The pull or rotation operation can be manually operated or automatically operated by a combination of a motor, a gear wheel, a rack, a belt and so on.

Figure 7:
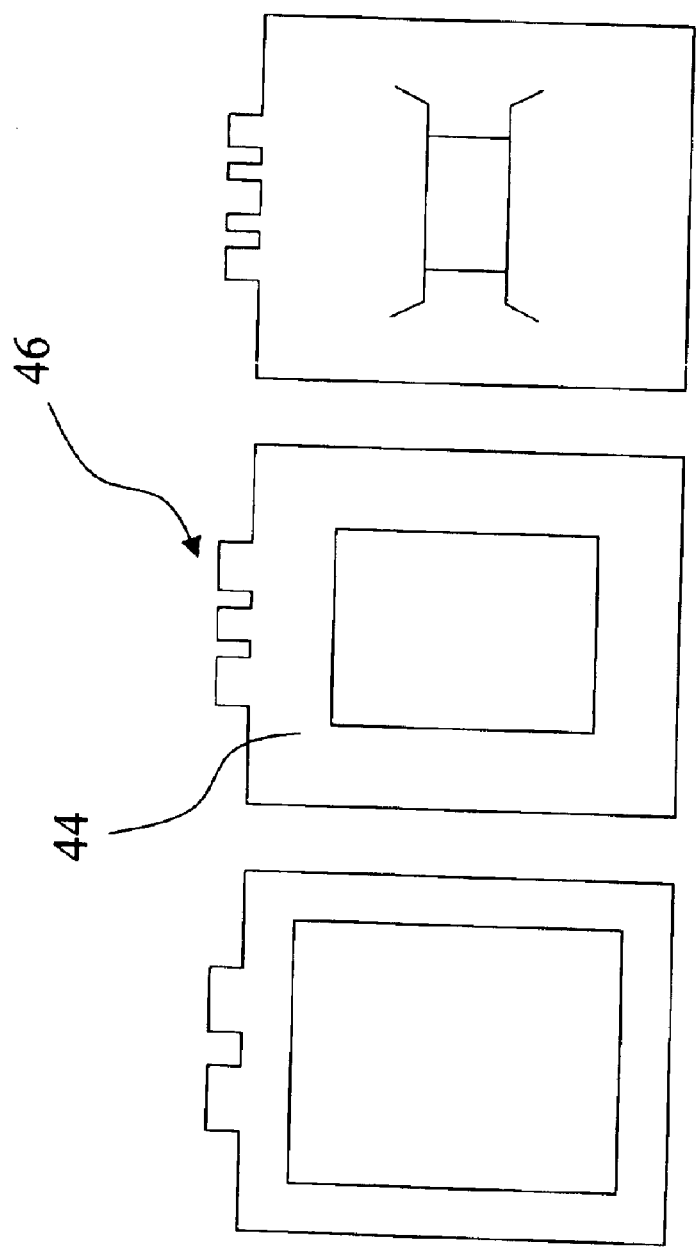
FIG. 7 is a diagram of a transparent film clip according to an embodiment of the present invention.

Referring to the FIG. 4 and FIG. 7, a transparent film 42 can be placed on the light source module 38 for projection, and can be installed in a transparent film clip 44 having a mark 46 and then be placed on the light source module 38 for projection. The transparent film clip 44 is variously installed in accordance with transparent films 42 of different sizes, and the marks 46 on different transparent film clips 44 are unique. The mark 46 is a positioning or locating mark and is also an identification mark for identifying the transparent film 42. The mark 46 can be at least one transparent opening, and the opening of each of the transparent film clip 44 has a different shape and number.

Figure 8:
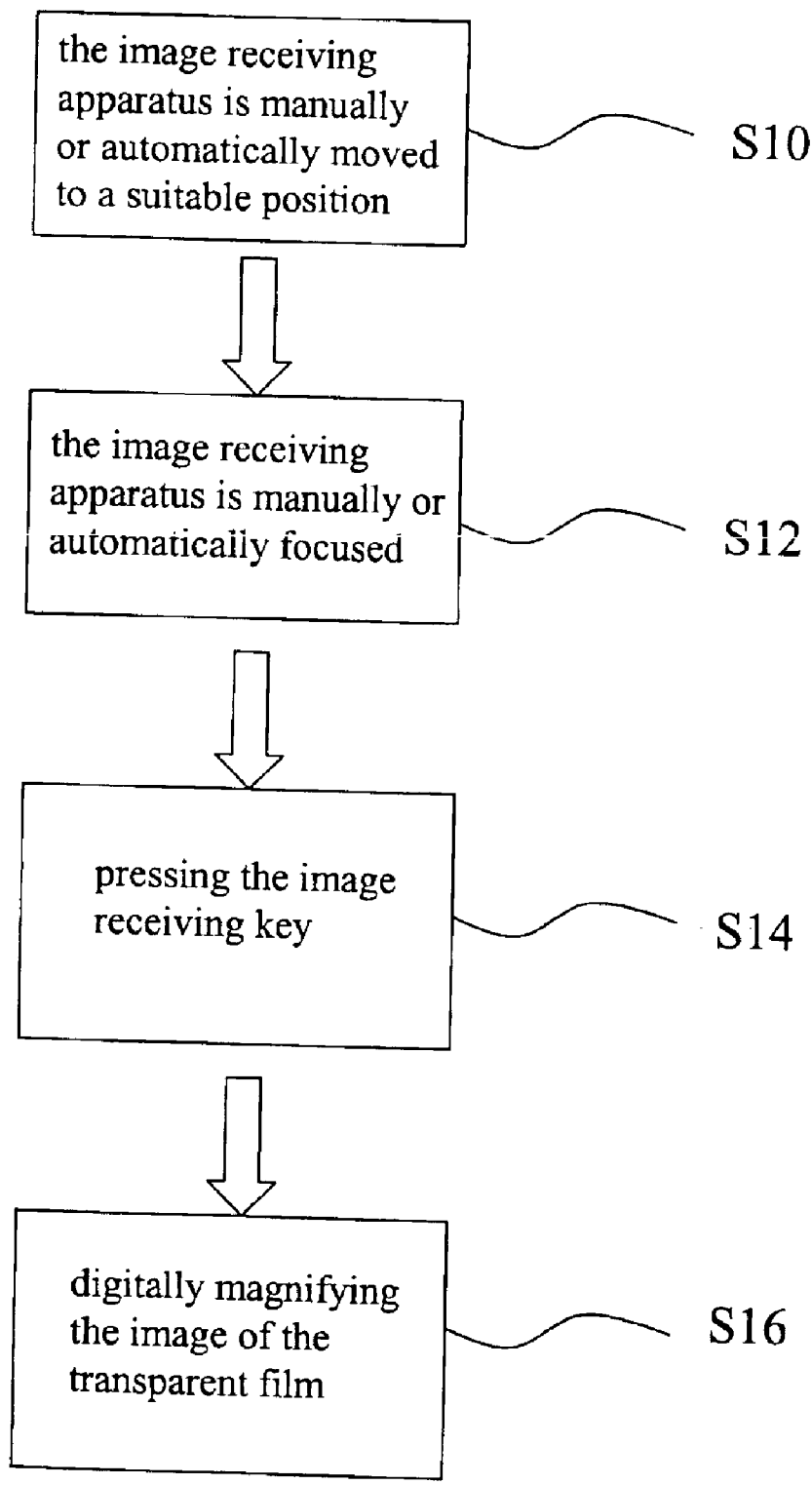
FIG. 8 is a flow chart illustrating using a real object projector to project a transparent film according to an embodiment of the present invention.

FIG. 8 shows an embodiment of the present invention using the real object projector. Firstly, in step S10, the image receiving apparatus is manually or automatically moved to a suitable position in accordance with the mark. In step S12, the image receiving apparatus is manually or automatically focused corresponding to the transparent film clip. In step S14, pressing the image receiving key 52 located on base 30 of the real object projector. Finally, in step S16, digitally magnifying the projection image of the transparent film with the control circuit corresponding to the type of transparent film clip. In above-mentioned step S14, the image receiving key 52 is selected from an image receiving key which assigns the size of the transparent film and an image receiving key which does not assign the size of the transparent film. If the image receiving key is selected from the later, between steps S14 and S16, the control circuit will automatically identify kinds of transparent film according to the mark on the transparent film clip. Step S14 can be further arranged before step S10, and the method is performed in the sequence of S14, S10, S12, and S16. This means pressing the image receiving key and automatically moving the image receiving apparatus to a suitable position, then automatically focusing and identifying the transparent film, and automatically magnifying the projection image or projected image of the transparent film. Step S12 can be further arranged after step S16, and the method is performed in the sequence of S10, S14, S16, and S12. This means manually moving the image receiving apparatus to a suitable position and pressing the image receiving key which assigns the size of the image, and automatically magnifying and manually focusing the projection image or projected image of the transparent film. Furthermore, the sequence of steps S12 and S14 can be exchanged, and the method is performed in the sequence of S10, S14, S12, and S16. This means manually moving the image receiving apparatus to a suitable position and pressing the image receiving key, then automatically focusing and identifying the kind of transparent film, and automatically magnifying the projection image of the transparent film.

Figure 9:
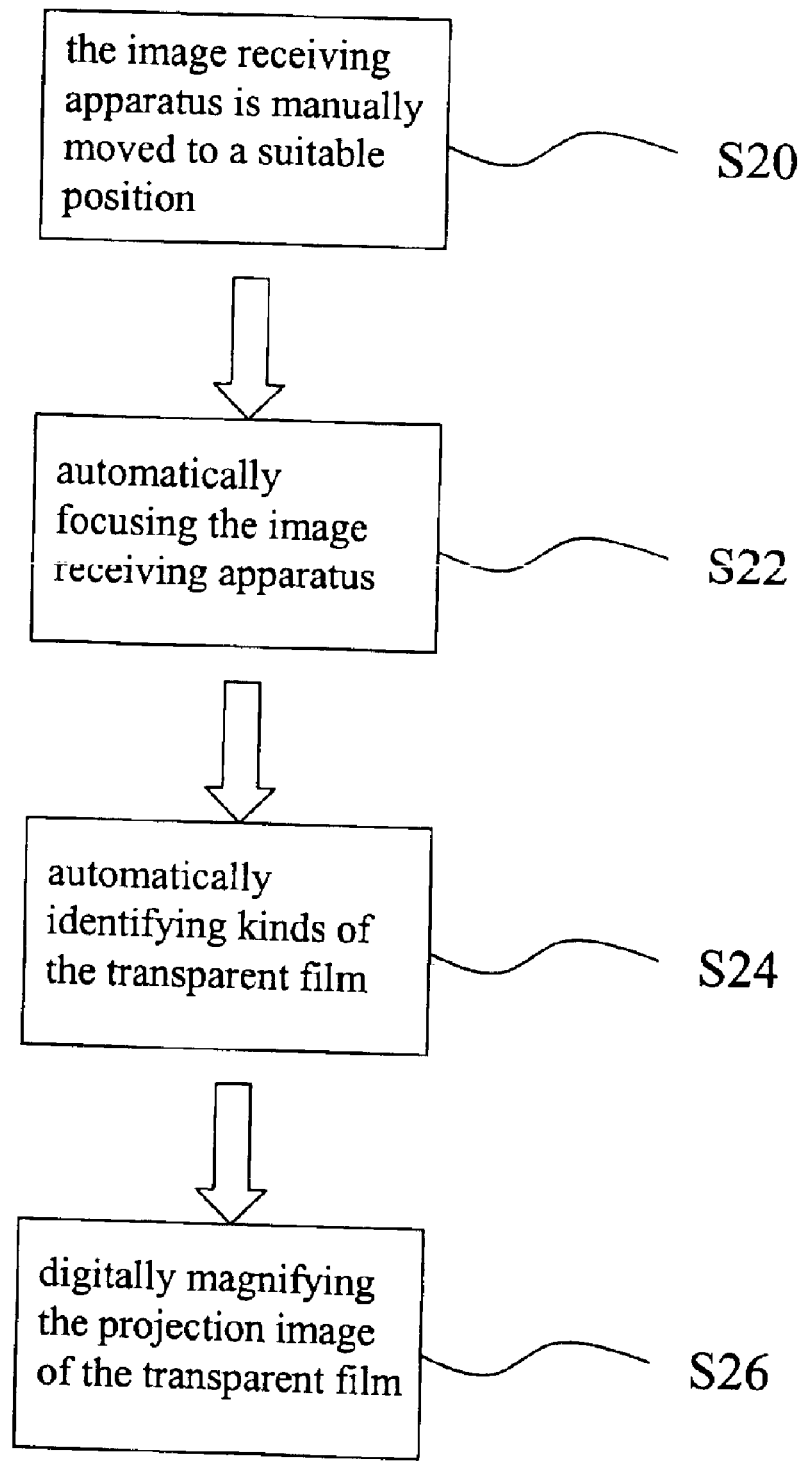
FIG. 9, FIG. 11 and FIG. 12 are flow charts illustrating using a real object projector according to embodiments of the present invention.

Referring to FIG. 9, which is a diagram illustrating an embodiment of the projection method according to present invention. In step S20, the image receiving apparatus is manually moved to a suitable position in accordance with the mark on the transparent film clip. In step S22, automatically focusing the image receiving apparatus. Finally, in steps S24 and S26, automatically identifying the kind of transparent film and digitally magnifying the projection image of the transparent film with the control circuit.

Figure 10:
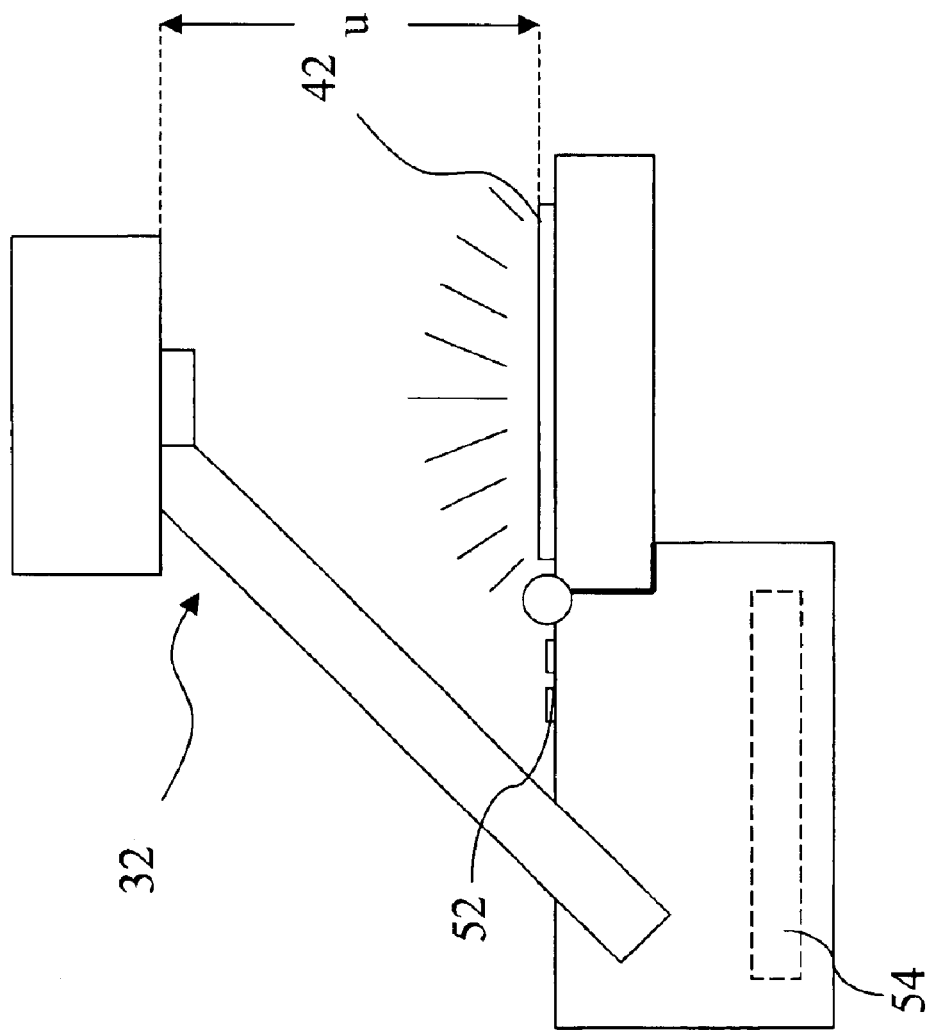
FIG. 10 is a diagram illustrating using a real object projector to project a transparent film according to an embodiment of the present invention.
Figure 11:
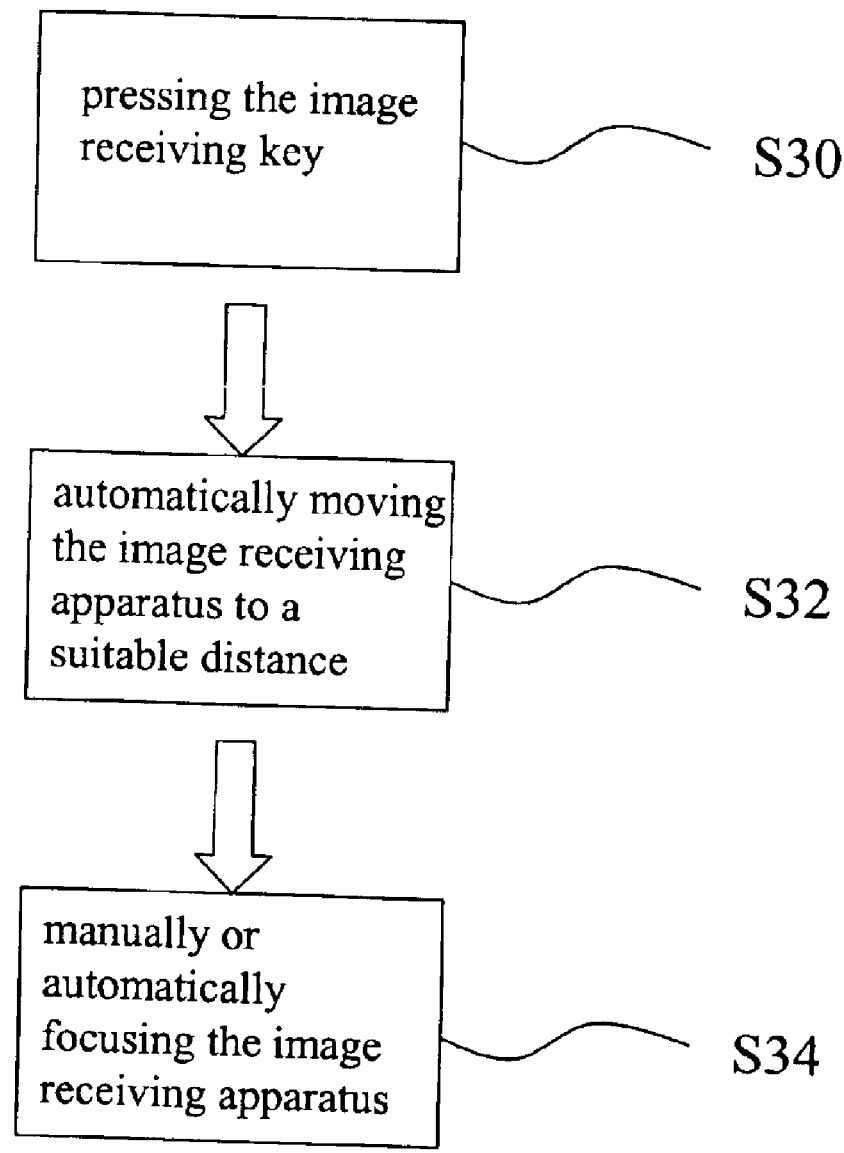

FIG. 10 is a diagram illustrating an embodiment of the projection method according to present invention. In this method, utilizing a change of distance u of the image receiving apparatus 32 and the transparent film 42 to magnifying the received image. Referring to FIG. 11, in step S30, firstly pressing the image receiving key located on the real object projector or on a computer which is connected to the real object projector. In step S32, automatically moving the image receiving apparatus to a suitable distance for maximizing an image. Finally, in step S34, manually or automatically focusing the image receiving apparatus according to the transparent film clip. In the above-mentioned step S30, the image receiving key is selected from an image receiving key which assigns the size of the transparent film and an image receiving key which does not assign the size of the transparent film. If the image receiving key is selected from the later, three steps are added between steps S30 and S32. The three steps comprise: (a) automatically moving the image receiving apparatus to a suitable position in accordance with the mark; (b) automatically focusing the image receiving apparatus; and (c) automatically identifying the type of the transparent film clip with the control circuit.

Figure 12:
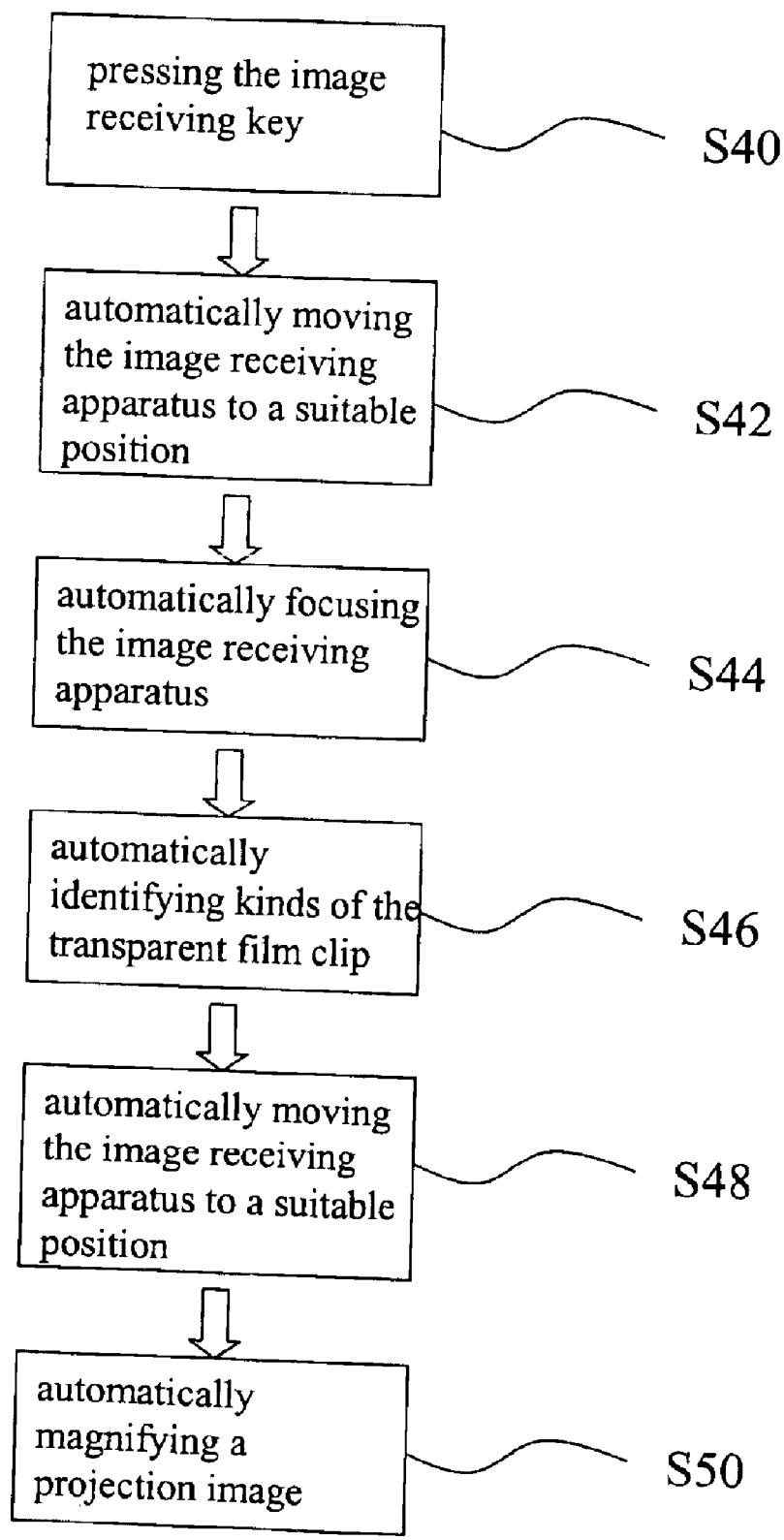

Besides the above-mentioned methods, the projection method according to the present invention can be further aimed to kinds of transparent film. Moving the image receiving apparatus to a suitable position for obtaining a sufficient magnifying power, and automatically zooming and focusing the image receiving apparatus to magnify the projected image. Referring to FIG. 12, in step S40, firstly pressing the image receiving key on the real object projector or a key on a computer which is connected to the real object projector. In step S42, automatically moving the image receiving apparatus to a suitable position in accordance with the mark on the transparent film clip. In step S44, automatically focusing the image receiving apparatus according to the transparent film clip. In step S46, automatically identifying the kind or type of transparent film clip with the control circuit. Then in step S48, automatically moving the image receiving apparatus to a suitable position for obtaining a sufficient magnifying power depending on the type of transparent film clip. Finally, in step S50, automatically zooming and focusing the image receiving apparatus to magnify a projection or projected image.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projection method of a real object projector, in which an image receiving key is used for operating the real object projector to project an image on a transparent film, the real object projector comprising a light source module, a control circuit disposed in a base and an image receiving apparatus, and the light source module further comprises a transparent film clip having a mark, the method comprising steps of:
   (a) pivotally displacing the light source module from a position overlaying the base to receive the transparent film thereon;
   (b) moving the image receiving apparatus to a suitable position according to the mark;
   (c) focusing the image receiving apparatus according to the transparent film clip;
   (d) pressing the image receiving key; and
   (e) digitally magnifying the projection image of the transparent film with the control circuit depending on a type of the transparent film clip.

2. The projection method of a real object projector of claim 1 wherein the step of moving the image receiving apparatus to a suitable position according to the mark is preceded by the step of encoding the mark in correspondence to a size of the transparent film.

3. A projection method of a real object projector for projecting a transparent film image, the real object projector comprising a light source module, a control circuit disposed in a base and an image receiving apparatus, and the light source module further comprises a transparent film clip having a mark, wherein the method comprises steps of:
   (a) withdrawing the light source module from the base to expose a support for the transparent film and positioning the transparent film thereon;
   (b) moving the image receiving apparatus to a suitable position according to the mark;
   (c) automatically focusing the image receiving apparatus according to the transparent film clip;
   (d) automatically identifying a kind of transparent film clip with the control circuit; and (e) digitally magnifying the projection image of the transparent film with the control circuit.

4. A projection method of a real object projector, in which an image receiving key is used for operating the real object projector to project a transparent film, the real object projector comprises a light source module, a control circuit disposed in a base and an image receiving apparatus, and the light source module further comprises a transparent film clip having a mark, wherein the method comprises steps of:

(a) withdrawing the light source module from the base to expose a support for the transparent film and positioning the transparent film thereon;

(b) pressing the image receiving key;

(c) moving the image receiving apparatus to a suitable position for maximizing a projection image; and (d) focusing the image receiving apparatus according to the transparent film clip.

5. A projection method of a real object projector, in which an image receiving key is used for operating the real object projector to project a transparent film, the real object projector comprising a light source module, a control circuit disposed in a base and an image receiving apparatus, and the light source module further comprises a transparent film clip having a mark, wherein the method comprises steps of:

(a) pivotally displacing the light source module from a position overlaying the base to receive the transparent film thereon;

(b) pressing the image receiving key;

(c) automatically moving the image receiving apparatus to a suitable position in accordance with the mark;

(d) automatically focusing the image receiving apparatus corresponding to the transparent film clip;

(e) automatically identifying kinds of the transparent film clip with the control circuit;

(f) automatically moving the image receiving apparatus to a suitable position for obtaining a sufficient magnifying power corresponding to kinds of the transparent film clip; and (g) automatically zooming and focusing the image receiving apparatus to magnify a projection image.

* * * * *